(12) United States Patent
Brandstetter et al.

(10) Patent No.: US 9,115,276 B2
(45) Date of Patent: Aug. 25, 2015

(54) POLYOLEFIN COMPOSITION WITH LOW CLTE

(75) Inventors: Franz Brandstetter, Alberndorf (AT); Klaus Maureder, Hörsching (AT); Michael Tranninger, Pucking (AT)

(73) Assignee: Borealis AG, Vienna (AT)

( * ) Notice: Subject to any disclaimer, the term of this patent is extended or adjusted under 35 U.S.C. 154(b) by 368 days.

(21) Appl. No.: 12/737,380

(22) PCT Filed: Jul. 10, 2009

(86) PCT No.: PCT/EP2009/058815
§ 371 (c)(1),
(2), (4) Date: Jan. 7, 2011

(87) PCT Pub. No.: WO2010/006999
PCT Pub. Date: Jan. 21, 2010

(65) Prior Publication Data
US 2011/0136959 A1 Jun. 9, 2011

(30) Foreign Application Priority Data
Jul. 14, 2008 (EP) .................................. 08160347

(51) Int. Cl.
| | | |
|---|---|---|
| *C08K 5/01* | (2006.01) | |
| *C08L 23/10* | (2006.01) | |
| *C08L 23/12* | (2006.01) | |
| *C08K 3/34* | (2006.01) | |
| *C08K 5/00* | (2006.01) | |
| *C08K 5/523* | (2006.01) | |
| *C08L 23/08* | (2006.01) | |
| *C08L 23/14* | (2006.01) | |
| *C08L 23/20* | (2006.01) | |

(52) U.S. Cl.
CPC .............. *C08L 23/10* (2013.01); *C08L 23/12* (2013.01); *C08K 3/34* (2013.01); *C08K 5/0083* (2013.01); *C08K 5/523* (2013.01); *C08L 23/0815* (2013.01); *C08L 23/142* (2013.01); *C08L 23/20* (2013.01); *C08L 2207/02* (2013.01)

(58) Field of Classification Search
CPC ..... C08L 2205/02; C08L 23/12; C08L 23/16; C08L 23/08; C08K 3/24; C08K 5/0083
USPC ........................................ 524/451, 477, 543
See application file for complete search history.

(56) References Cited

U.S. PATENT DOCUMENTS

| 4,696,979 A * | 9/1987 | Shiga et al. .................... 525/247 |
| 2004/0044107 A1* | 3/2004 | Kikuchi et al. ................ 524/186 |
| 2007/0037914 A1* | 2/2007 | Heck et al. ..................... 524/451 |

FOREIGN PATENT DOCUMENTS

| CN | 85101851 A | 5/1986 |
| DE | 19754061 A1 * | 6/1999 |
| EP | 1 477 525 | 11/2004 |
| EP | 1 746 128 | 1/2007 |
| EP | 1935938 A1 * | 6/2008 |

OTHER PUBLICATIONS

Machine translation of DE 19754061 A1, 1999.*
Dow (Engage polyolefin elastomers), 2013.*
"Functionalization and Modification of Polyolefin Science and Technology", Youliang, Hu, et. al., Chemical Industry Press, 2006 (March First Edition), p. 351, Sec. III "Nucleating Agent", ch. 12, and p. 355, Sec. III "The Use of Nucleating Agent in Polypropylene".
"Structure, Properties and Preparation of Polyolefins Produced by Single-site Catalyst Technology", Chum, S.P., Kao, C.I., Knight, G.W., ch. 12 pp. 261-286, Metallocene Polyolefins (2000).
"Designer' Nucleating Agents for Polypropylene", Blomenhofer, M., Ganzelben, S., Hanft, D. Schmidt, HW., Kristiansen, M., Smith, P., Stoll, K., Mader, D., Hoffmann, K., Macromolecules, (2005) ch. 38, pp. 3688-3695.
"The Dimensions of Chain Molecules Containing Branches and Rings", Zimm, B., Stockmeyer, W., pp. 1301-1314, The Journal of Chemical Physics, vol. 17, No. 12 (1949).

* cited by examiner

*Primary Examiner* — Wenwen Cai
(74) *Attorney, Agent, or Firm* — Warn Partners, P.C.

(57) ABSTRACT

The invention relates to novel polyolefin compositions having a low coefficient of thermal expansion (CLTE), high stiffness and high flowability. The novel compositions comprise a heterophasic propylene copolymer, an inorganic filler, an ethylene/alpha-olefin elastomer and at least two different alpha-nucleating agents.

16 Claims, No Drawings

POLYOLEFIN COMPOSITION WITH LOW CLTE

This application is a National Stage of International Application No. PCT/EP2009/058815, filed Jul. 10, 2009. This application claims priority to European Patent Application No. 08160347.4 filed on Jul. 14, 2008. The disclosures of the above applications are incorporated herein by reference.

The invention relates to novel polyolefin compositions having a low coefficient of thermal expansion (CLTE), high stiffness and high flowability. More particularly, the invention relates to a polyolefin composition which comprises a heterophasic propylene copolymer, an ethylene/α-olefin elastomer, an inorganic filler and α-nucleating agent.

The polyolefin compositions of the present invention are especially useful for automotive applications, where large parts are prepared by injection moulding with as little energy input as possible and where these large parts must fulfil high requirements regarding stiffness and thermal dimensional stability, e.g. body panels.

BACKGROUND OF THE INVENTION

Modern polymer materials for exterior automotive parts are often comprised of blends of acrylonitrile butadiene styrene with polyamide (ABS/PA) or blends of polycarbonate with polybutylene terephthalate (PC/PBT). These materials are characterised by rather high stiffness (tensile modulus above 2000 MPa) and by an excellent glossy surface of injection moulded parts produced therefrom. The disadvantage of these materials is, that they have a rather high CLTE, which makes them not suitable for zero-gap applications, where the polymer material should have a CLTE as close as possible to that of adjacent steel parts. A further disadvantage of these materials is their low flowability (high viscosity), which makes it difficult to process them during injection moulding. Much more pressure and energy is required to completely fill a mould with ABS/PA or PC/PBT than with a polyolefin.

The current polyolefin compositions are not suitable for these bodypanel applications, because—although their CLTE is lower and flowability higher than for most ABS/PA and PC/PBT systems—present polyolefin compositions are deficient in stiffness.

Object

It is therefore the object of the present invention to provide a polyolefin composition having a low CLTE, high stiffness and which simultaneously has high flowability.

Surprisingly, the above object could be achieved with a polyolefin composition comprising a) 50-70 wt % of a heterophasic propylene copolymer comprising
  i. 70-90 wt %, based on the weight of the heterophasic propylene copolymer of a propylene homopolymer,
  ii. 10-30 wt %, based on the weight of the heterophasic propylene copolymer of an ethylene-propylene rubber,
b) 2-10 wt % of an ethylene/α-olefin elastomer, the α-olefin being a $C_4$-$C_{10}$ α-olefin,
c) 20-46 wt % of an inorganic filler and
d) at least two different α-nucleating agents in a total amount of 0.0011 to 2.0 wt %.

As will be shown in the examples section, the polyolefin compositions according to the invention have a flowability which is as good as or even better than the flowability of other polyolefin compositions on the market. However, stiffness and heat deformation temperature (HDT) are remarkably improved and CLTE is the lowest in the field. Compared to non-polyolefin compositions (ABS/PA and PC/PBT), the polyolefin compositions according to the invention are additionally very much improved in flowability.

According to the invention, the polyolefin composition according to the invention comprises 50-70 wt % of a heterophasic propylene copolymer. Preferably the amount of the heterophasic propylene copolymer is at least 54 wt %, more preferably at least 57 wt %. Preferably the amount of the heterophasic propylene copolymer is not more than 66 wt %, more preferably not more than 63 wt %.

If the amount of the heterophasic propylene copolymer is below 50 wt %, flowability of the polyolefin composition would be reduced. If the amount of the heterophasic propylene copolymer is above 70 wt % the stiffness would be reduced and CLTE would become too large.

The MFR of the heterophasic propylene copolymer can be selected to give optimum processability while maintaining all other desired properties. Accordingly, the MFR of the heterophasic propylene copolymer is from 5-70 g/10 min. Preferably the MFR of the heterophasic propylene copolymer is 8-50 g/10 min, more preferably 10-40 g/10 min, still more preferably 13-30/10 min, most preferably 16-25 g/10 min.

According to the invention, the heterophasic propylene copolymer is comprised of 70-90 wt % of a propylene homopolymer and 10-30 wt % of an ethylene-propylene rubber. Preferably the amount of propylene homopolymer is 73-87 wt %, more preferably 75-85 wt %, still more preferably 77-83 wt %. Accordingly, the preferred amount of ethylene-propylene rubber is 13-27 wt %, more preferably 15-25 wt %, still more preferably 17-23 wt %.

A carefully selected ratio of propylene homopolymer to ethylene-propylene rubber contributes to the impact strength of the polyolefin composition and also to shrinkage behaviour.

Preferably, the heterophasic copolymer has an XCS content of from 10-35 wt %. The XCS content of the heterophasic copolymer is related to the amount of ethylene-propylene rubber, but it is not necessarily exactly the same. For example, the ethylene-propylene rubber may also comprise a portion with very high ethylene concentration, which is crystalline and therefore insoluble in cold xylene. More preferably, the heterophasic copolymer has an XCS content of from 12-30 wt %, still more preferably of 15-25 wt % and most preferably 17-23 wt %.

A further parameter, which is useful to fine tune the properties of the polyolefin composition of the present invention is the ethylene content of the XCS content of the heterophasic propylene copolymer. It has been found that a rather low ethylene content helps to ensure a favourable ratio between impact strength and CLTE. Accordingly, the ethylene content of the XCS content of the heterophasic propylene copolymer is in the range of from 20-50 wt %, preferably 25-45 wt %, more preferably 30-40 wt %, most preferably 32-37 wt %.

A still further parameter which can be used to tailor the properties of the polyolefin composition is the intrinsic viscosity (IV) of the XCS content of the heterophasic propylene copolymer. According to the invention, the IV of the XCS content of the heterophasic propylene copolymer is in a range of 1.5-4 dl/g, preferably 1.8-3.5 dl/g, more preferably 2.0-3.0 dl/g, most preferably 2.3-2.8 dl/g. This range has been found to ensure good impact properties.

In order to reach the desired level of stiffness, CLTE and HDT, the polyolefin composition of the invention comprises an inorganic filler in a selected amount. Accordingly, the polyolefin composition according to the present invention comprises an inorganic filler in an amount of from 20-46 wt %, preferably 25-40 wt %, more preferably 25-35 wt %, still more preferably 29-33 wt %.

If the amount of inorganic filler is above 46 wt %, the polyolefin composition does not have the necessary flowability and not the required impact strength. If the amount of inorganic filler is below 20 wt %, its contribution to stiffness would be too low and CLTE too high.

According to a preferred embodiment of the present invention, the inorganic filler is selected from the group consisting of talc and wollastonite.

According to a still further preferred embodiment, the inorganic filler is talc.

According to a preferred embodiment of the present invention, the inorganic filler, which is used for the polyolefin composition has a median particle size ($D_{50}$) of 1.0-15 μm and a top cut ($D_{97}$) of 3-50 μm.

With $D_{50}$>15 μm and a top cut>50 μm, the reinforcing effect of the inorganic filler becomes too small. With $D_{50}$<1 μm and a top cut<3 μm, the majority of the filler particles would be in the nanoscale range, which means that the energy which is required for a homogeneous distribution of the filler particles in the polyolefin becomes unfavourably large.

The median particle size $D_{50}$ is clearly defined, however, which fraction is used to define the top cut depends on the producer of the inorganic filler. A usual method for measuring particle size distribution is a laser diffraction method. Usual fractions defining the top cut of an inorganic filler are $D_{95}$, $D_{97}$ and $D_{98}$. For the present invention, the fraction $D_{97}$ is preferred for defining top cut.

Further, more preferred embodiments for the particle size of the inorganic filler are a median particle size $D_{50}$ of 2.0-12 μm and a top cut ($D_{97}$) of 5-40 μm, still more preferred $D_{50}$ of 3.0-10 μm and top cut of 10-30 μm, most preferred $D_{50}$ of 4.0-8 μm and top cut ($D_{97}$) of 15-25 μm.

According to a particularly preferred embodiment, the inorganic filler, which is used for the polyolefin composition of the present invention is talc which has a median particle size $D_{50}$ of 3.0-10 μm and a top cut ($D_{97}$) of 10-30 μm, preferably $D_{50}$ of 4-8 μm and a top cut ($D_{97}$) of 15-25 μm.

The polyolefin composition according to the invention further comprises an ethylene/α-olefin elastomer, where the α-olefin is a $C_4$-$C_{10}$ α-olefin. Preferably, the α-olefin is 1-butene, 1-hexene or 1-octene, more preferably 1-butene or 1-octene, most preferably 1-octene. The ethylene/α-olefin elastomer, helps to establish a desired level of impact strength.

According to a basic embodiment of the present invention, the polyolefin composition comprises 2-10 wt % ethylene/α-olefin elastomer. Preferably, the polyolefin composition comprises 3-8 wt % ethylene/α-olefin elastomer. According to a preferred embodiment, the polyolefin composition comprises 3-6 wt % ethylene/1-octene elastomer.

According to an embodiment of the present invention, the ethylene/α-olefin elastomer has a density of from 860-915 kg/m³.

Preferably the density is from 860-900 kg/m³, more preferably from 860-890 kg/m³. Particularly preferred is a density of either 865-875 kg/m³, and especially 870 kg/m³ when the α-olefin is 1-octene in an amount of 38 wt % based on the weight of the ethylene/α-olefin elastomer, or a density of 878-886 kg/m³ and especially 882 kg/m³ when the α-olefin is 1-octene in an amount of 27.5 wt % based on the weight of the ethylene/α-olefin elastomer.

The MFR of the ethylene/α-olefin elastomer which is used for the present invention is preferably selected—together with further properties described herein—to fine tune the impact properties of the polyolefin composition.

An advantageous MFR range for the ethylene/α-olefin elastomer has been found to be from 0.3-100 g/10 min (190° C., 2.16 kg).

A preferred upper limit for the MFR of the ethylene/α-olefin elastomer is 30 g/10 min, more preferably 15 g/10 min, still more preferably 10 g/10 min, even more preferably 7 g/10 min, most preferably 4 g/10 min.

A preferred range for the MFR of the ethylene/α-olefin elastomer is 0.3-2 g/10 min, more preferably 0.5-1.5 g/10 min.

The flowability of the polyolefin composition is selected such that it is suitable for a range of applications, particularly for moulding applications, especially injection moulding.

Accordingly, the MFR of the polyolefin composition is advantageously from 5.0-50 g/10 min (230° C., 2.16 kg) preferably 8-40 g/10 min, more preferably 10-30 g/10 min, most preferably 10-20 g/10 min.

The polyolefin composition further contains up to 2 wt % of two or more alpha-nucleating agents. A lower limit of 0.001 wt % of alpha-nucleating agents is preferred. Preferably the polyolefin composition comprises 0.005 to 0.5 wt %, more preferably 0.01 to 0.3 wt %, most preferably 0.04-0.15 wt % of two or more alpha-nucleating agents.

Smaller amounts of alpha-nucleating agents than 0.001 wt % usually do not give the desired level of effect, while with larger amounts than 2 wt %, although giving the desired effect, the polyolefin compositions are becoming too expensive because of the high priced nucleating agents.

The alpha-nucleating agents which may be used for the polyolefin composition of the invention include organic alpha-nucleating agents selected from the group of phosphorous based nucleating agents like phosphoric acid esters metal salts represented by formula I

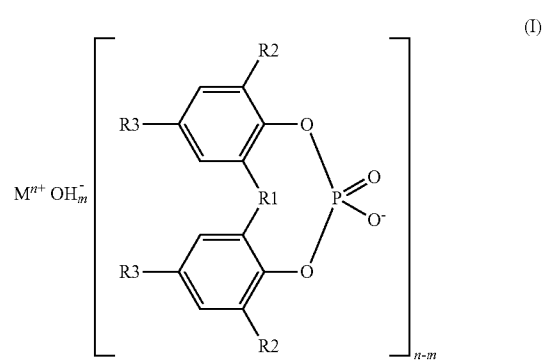

wherein R1 is oxygen, sulphur or a hydrocarbon group of 1 to 10 carbon atoms; each of R2 and R3 is hydrogen or a hydrocarbon or a hydrocarbon group of 1 to 10 carbon atoms; R2 and R3 may be the same or different from each other, two of R2, two of R3, or R2 and R3 may be bonded together to form a ring, M is a monovalent to trivalent metal atom; n is an integer from 1 to 3 and m is either 0 or 1, provided that n>m.

Preferred examples of the alpha nucleating agents represented by the above formula include sodium-2,2'-methylene-bis(4,6-di-t-butyl-phenyl)phosphate, sodium-2,2'-ethylidene-bis(4,6-di-t-butylphenyl)-phos-phate, lithium-2,2'-methylene-bis(4,6-di-t-butylphenyl)phosphate, lithium-2,2"-ethylidene-bis(4,6-di-t-butylphenyl)phosphate, sodium-2,2"-ethyli-dene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl)phosphate, calcium-bis[2,2"-thiobis(4-methyl-6-t-butylphenyl)phosphate], calcium-bis[2,2''-thiobis(4-ethyl-6-t-butylphenyl)-phosphate], calcium-bis[2,2''-thiobis(4,6-di-t-butylphenyl)phosphate], magnesium-bis[2,2''-thiobis(4,6-di-t-butylphenyl)phosphate], magnesium-bis[2,2''-thiobis(4-t-octylphenyl)phosphate], sodium-2,2'-butylidene-bis(4,6-dimethylphenyl)phosphate, sodium-2,2'-butylidene-bis(4,6-di-t-butyl-phenyl)-phosphate, sodium-2,2'-t-octylmethylene-bis(4,6-dimethyl-phenyl)-phosphate, sodium-2,2'-t-octylmethylene-bis(4,6-di-t-butylphenyl)-phos-phate, calcium-bis[2,2''-methylene-bis(4,6-di-t-butylphenyl)-phosphate], magnesium-bis[2,2''-methylene-bis(4,6-di-t-butylphenyl)-phosphate], barium-bis[2,2''-methylene-bis(4,6-di-t-butylphenyl)-phosphate], sodium-2,2''-methylene-bis(4-methyl-6-t-butylphenyl)-phosphate, sodium-2,2'-methyl-lene-bis(4-ethyl-6-t-butylphenyl)phos-phate, sodium(4,4'-dimethyl-5,6'-di-t-butyl-2,2''-biphenyl)phosphate, calcium-bis-[(4,4''-dimethyl-6,6''-di-t-butyl-2,2''biphenyl)phosphate], sodium-2,2'-ethyli-dene-bis(4-m-butyl-6-t-butyl-phenyl)phosphate, sodium-2,2''-methylene-bis-(4,6-di-methylphenyl)-phos-phate, sodium-2,2''-methylene-bis(4,6-di-t-ethyl-phenyl)phosphate, potassium-2,2''-ethylidene-bis(4,6-di-t-butylphenyl)-phosphate, calcium-bis[2,2''-ethylidene-bis(4,6-di-t-butylphenyl)-phos-phate], magnesium-bis[2,2''-ethyli-dene-bis(4,6-di-t-butylphenyl)-phosphate], barium-bis[2,2''-ethylidene-bis-(4,6-di-t-butylphenyl)-phosphate], aluminium-hydroxy-bis[2,2''-methylene-bis(4,6-di-t-butyl-phenyl)phosphate], aluminium-tris[2,2''-ethylidene-bis(4,6-di-t-butylphenyl)-phosphate].

A second group of phosphorous based nucleating agents includes for example aluminium-hydroxy-bis[2,4,8,10-tetrakis(1,1-dimethylethyl)-6-hydroxy-12H-dibenzo-[d,g]-dioxa-phoshocin-6-oxidato] and blends thereof with Li-myristate or Li-stearate.

Of the phosphorous based nucleating agents sodium-2,2''-methylene-bis(4,6-di-t-butylphenyl)phosphate or aluminium-hydroxy-bis[2,2''-methyl-lene-bis(4,6-di-t-butyl-phenyl)-phosphate] or aluminium-hydroxy-bis-[2,4,8,10-tetrakis(1,1-dimethylethyl)-6-hydroxy-12H-dibenzo-[d,g]-dioxa-phoshocin-6-oxidato] or blends thereof with Li-myristate or Li-stearate are especially preferred.

Also Sorbitol-based nucleating agents, like optionally substituted dibenzylidine sorbitol (e.g. 1,3:2,4 Dibenzylidene sorbitol, 1,3:2,4 Di(methylbenzylidene) sorbitol 1,3:2,4 Di(ethylbenzylidene) sorbitol, 1,3:2,4 Bis(3,4-dimethylbenzylidene) sorbitol, etc.) or pine rosin can be used as nucleating agents.

Further suitable alpha-nucleating agents are polymeric nucleating agents selected from the group consisting of vinylcycloalkane polymers and vinylalkane polymers. Nucleation with these polymeric nucleating agents is either accomplished by a special reactor technique, where the catalyst is prepolymerised with monomers like e.g. vinylcyclohexane (VCH), or by blending the propylene polymer with the vinyl (cyclo)alkane polymer. These methods are described in greater detail in e.g. EP 0 316 187 A2 and WO 99/24479, the disclosure of which is incorporated herein by reference.

Suitable alpha-nucleating agents for the polyolefin composition of the invention are in addition nucleating agents, as described for example in Macromolecules 2005, 38, 3688-3695, the disclosure of which is incorporated herein by reference.

Nucleating agents such as ADK NA-11 (Methylen-bis(4,6-di-t-butylphenyl)phosphate sodium salt) and ADK NA-21 (comprising aluminium hydroxy-bis[2,4,8,10-tetrakis(1,1-dimethylethyl)-6-hydroxy-12H-dibenzo-[d,g]-dioxa-phoshocin-6-oxidato]) are commercially available from Asahi Denka Kokai and are among those which are preferably added to the polyolefin composition of the invention. Millad 3988 (3,4-Dimethylbenzylidene sorbitol), Millad 3905 and Millad 3940 available from Milliken & Company are other examples of nucleating agents that can be utilised in the invention.

Further commercial available alpha-nucleating agents, which can be used for the composition of the invention are, for example, Irgaclear XT 386 (N-[3,5-bis-(2,2-dimethyl-propionylamino)-phenyl]-2,2-dimethylpropionamide) from Ciba Speciality Chemicals, Hyperform HPN-68L and Hyperform HPN-20E from Milliken & Company.

Among all alpha-nucleating agents mentioned above, aluminium hydroxy-bis[2,4,8,10-tetrakis(1,1-dimethylethyl)-6-hydroxy-12H-dibenzo-[d,g]-dioxa-phoshocin-6-oxidato] based nucleating agents like ADK NA-21, NA-21 E, NA-21 F, etc., sodium-2,2''-methylene-bis(4,6-di-t-butylphenyl)phosphate (ADK NA-11), aluminium-hydroxy-bis[2,2''-methylene-bis(4,6-di-t-butyl-phenyl)-phosphate], sorbitol-based nucleating agents like Millad 3988, Millad 3905 and Millad 3940 and polymeric nucleating agents selected from the group consisting of vinylcycloalkane polymers and vinylalkane polymers are particularly preferred.

It is preferred for the present invention, that at least one of the at least two alpha-nucleating agents is comprised of a polymeric nucleating agent selected from the group consisting of vinylcycloalkane polymers and vinylalkane polymers, preferably poly-vinylcyclohexane (pVCH).

According to a preferred embodiment, the polyolefin composition of the invention comprises exactly two different alpha-nucleating agents.

According to a still further preferred embodiment, one alpha-nucleating agent is comprised of a polymeric nucleating agent selected from the group consisting of vinylcycloalkane polymers and vinylalkane polymers, preferably poly-vinylcyclohexane (pVCH), and the second alpha-nucleating agent is selected from the group consisting of aluminium hydroxy-bis[2,4,8,10-tetrakis(1,1-dimethylethyl)-6-hydroxy-12H-dibenzo-[d,g]-dioxa-phoshocin-6-oxidato] based nucleating agents (e.g. ADK NA-21, NA-21 E, NA-21 F), sodium-2,2''-methylene-bis(4,6-di-t-butylphenyl)phosphate (ADK NA-11), aluminium-hydroxy-bis[2,2''-methylene-bis(4,6-di-t-butyl-phenyl)-phosphate] and sorbitol-based nucleating agents (e.g. Millad 3988, Millad 3905 and Millad 3940).

It is even further preferred, that the polyolefin composition of the invention comprises one alpha-nucleating agent comprised of a polymeric nucleating agent selected from the group consisting of vinylcycloalkane polymers and vinylalkane polymers, preferably poly-vinylcyclohexane (pVCH), and a second alpha-nucleating agent selected from the group consisting of aluminium hydroxy-bis[2,4,8,10-tetrakis(1,1-dimethylethyl)-6-hydroxy-12H-dibenzo-[d,g]-dioxa-phoshocin-6-oxidato] based nucleating agents (e.g. ADK NA-21, NA-21 E, NA-21 F), sodium-2,2''-methylene-bis(4,6-di-t-butylphenyl)phosphate (ADK NA-11) and aluminium-hydroxy-bis[2,2''-methylene-bis(4,6-di-t-butyl-phenyl)-phosphate].

Most preferred are polyolefin compositions containing as alpha-nucleating agents poly-vinylcyclohexane (pVCH) and sodium-2,2''-methylene-bis(4,6-di-t-butylphenyl)phosphate (ADK NA-11).

For those embodiments where one of the alpha-nucleating agents is selected from the group consisting of vinylcycloalkane polymers and vinylalkane polymers, preferably poly-vinylcyclohexane (pVCH), the typical concentration of vinyl (cyclo)alkane polymer in the polyolefin composition is from 0.0001-1.0 wt %, preferably 0.0001-0.1 wt %, more preferably 0.001-0.05 wt %, most preferably 0.001-0.01 wt %.

The second alpha nucleating agent which is not a polymeric nucleating agent is typically present in the polyolefin composition in an amount of from 0.001-1.0 wt %, preferably 0.001-0.5 wt %, more preferably 0.01-0.5 wt %, most preferably 0.01-0.3 wt %.

The polyolefin compositions which are used for the invention may contain various additives, which are generally used in propylene compositions, such as stabilizers, antioxidants, acid neutralizing agents, lubricants, ultraviolet absorbers, pigments, provided that they do not adversely affect the desired properties of the composition.

It is accordingly preferred, that the additives shall be not more than 10.0 wt %, preferably not more than 8.0 wt %, more preferably not more than 5.0 wt %, yet more preferably not more than 4.0 wt %, still more preferably not more than 3.0 wt %, in the total polyolefin composition.

Further the present polyolefin composition may comprise additional polymer components other than the heterophasic propylene copolymer and ethylene/alpha-olefin elastomer. However the present invention is in particular directed to a polyolefin composition where the heterophasic propylene copolymer and the ethylene/alpha-olefin elastomer together account for at least 90.0 wt % of all polymeric components of the polyolefin composition, preferably at least 93.0 wt %, more preferably at least 95.0 wt %, yet preferably at least 97.0 wt %, still more preferably at least 99.0 wt % of all polymeric components of the polyolefin composition.

The polyolefin compositions of the present invention are suitable for a wide range of applications.

They are particularly suitable for the production of moulded articles, in particular for the production of injection moulded articles. Preferred examples of such injection moulded articles are large parts for exterior applications in the automotive industry, in particular body panels.

Accordingly, a further aspect of the invention is a moulded article comprising a polyolefin composition as herein described.

A still further aspect of the invention is an injection moulded article comprising a polyolefin composition as herein described.

Compared to other polyolefin compositions, which are today used for similar or the same applications, the inventive polyolefin compositions have a unique balance of properties. Their flowability (determined by a method which is described in the examples section) is very much improved compared to ABS/PA and PC/PBT blends and comparable to modern polyolefin compositions. Further, they show a unique combination of low CLTE (<60 μm/m.K), high stiffness (Tensile modulus>>2500 MPa) and high HDT (>60° C.). It is remarkable, that the stiffness values are exceeding the respective values of ABS/PA and PC/PBT blends and comparable modern polyolefin compositions by far, while CLTE is by far superior to that of ABS/PA and PC/PBT blends and still somewhat better than that of modern polyolefin compositions.

Accordingly, a further aspect of the invention is directed to using a polyolefin composition as herein described for producing injection moulded articles having the following properties:

a. CLTE<60 μm/m.K
b. Tensile Modulus>2500 MPa

Description of Heterophasic Copolymer

A heterophasic propylene copolymer according to the invention has preferably a multiphase structure with a continuous propylene homopolymer matrix and inclusions comprising at least an amorphous ethylene-propylene rubber, which is an elastomeric phase. Optionally, the rubber also comprises some crystalline polyethylene. Normally such a heterophasic propylene copolymer is obtained by carrying out a multi-stage process, like at least a two-stage process, resulting in such heterophasic system.

Preferably the polypropylene homopolymer is isotactic. The isotacticity of polypropylene is determined by $^{13}$C-NMR as triade percentage (mm %). Accordingly it is appreciated that the polypropylene homopolymer has a rather high triad percentage, i.e. higher than 90%, more preferably higher than 92%, still more preferably higher than 93%, even more preferably higher than 95% and most preferably higher than 98%.

Additionally it is appreciated that the polypropylene homopolymer is not chemically modified as it is known for instance from high melt strength polymers (HMS-polymer). Thus the heterophasic propylene copolymer is not cross-linked. The impact behaviour can normally also be improved by using branched polypropylenes as for instance described in EP 0 787 750, i.e. single branched polypropylene types (Y-polypropylenes having a backbone with a single long side-chain and an architecture resembles a "Y"). Such polypropylenes are characterized by rather high melt strength. A parameter of the degree of branching is the branching index g'. The branching index g' correlates with the amount of branches of a polymer. The branching index g' is defined as $g'=[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference. Thus it is preferred that the branching index g' of the polypropylene homopolymer shall be at least 0.85, more preferably at least 0.90, yet more preferably at least 0.95, like 1.00.

The expression propylene homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable. The comonomer content can be determined with FT infrared spectroscopy, as described below in the examples.

The propylene homopolymer can be unimodal or multimodal, like bimodal in view of the molecular weight distribution.

The expression "multimodal" or "bimodal" used herein refers to the modality of the polymer, i.e.

the form of its molecular weight distribution curve, which is the graph of the molecular weight fraction as a function of its molecular weight.

As will be explained below, the propylene homopolymer can be produced in a single step or in a sequential step process, using reactors in serial or parallel configuration and which can be operated at different reaction conditions. As a consequence, each fraction prepared in a specific reactor can have its own molecular weight distribution.

When the distribution curves from these fractions are superimposed to obtain the molecular weight distribution curve of the final polymer, these curves may show two or more maxima or at least be distinctly broadened when compared with curves for the individual fractions. Such a polymer, produced in two or more serial or parallel steps, is called bimodal or multimodal, depending on the number of steps.

Accordingly the propylene homopolymer may be multimodal or bimodal in view of the molecular weight.

Further in case the polypropylene homopolymer is of multimodal, like bimodal, in view of the molecular weight, it is appreciated that the individual fractions are present in amounts influencing the properties of the material. Accordingly it is appreciated that each of these fractions is at least present in an amount of 10 wt.-% based on the polypropylene homopolymer. Accordingly in case of a bimodal system, in particular in view of the molecular weight, the split of the two fractions is roughly 50:50. Thus in a preferred embodiment the polypropylene homopolymer comprises two fractions which differ in their molecular weight, wherein the first fraction having the lower molecular weight is present from 40 to 60 wt.-% and the second fraction having the higher molecular weight from 60 to 40 wt.-%.

It is further appreciated that the polypropylene homopolymer has a medium melt flow rate (MFR), i.e. a medium molecular weight. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the propylene homopolymer has an $MFR_2$ (230° C.) below 80 g/10 min, more preferably below 70 g/10 min, still more preferably below 55 g/10 min.

As a further requirement of the present invention the heterophasic propylene copolymer must comprise an ethylene-propylene rubber.

Like the polypropylene homopolymer the elastomeric ethylene-propylene rubber can be unimodal or multimodal, like bimodal. However it is preferred that the ethylene/propylene rubber is unimodal. Concerning the definition of unimodal and multimodal, like bimodal, it is referred to the definition above.

According to the present invention, there is also provided a process for the manufacture of the polyolefin composition discussed above. The ethylene-propylene rubber may be blended with the polypropylene homopolymer after their polymerizations and are subsequently mixed with the ethylene/alpha-olefin elastomer and the inorganic filler and the alpha-nucleating agents. However, more desirably, the heterophasic propylene copolymer is produced in a multistage process and subsequently mixed with the ethylene/alpha-olefin elastomer and the inorganic filler and the alpha-nucleating agents. In a particular preferred embodiment the polypropylene homopolymer is produced in at least one slurry reactor or a slurry and a gas phase reactor and subsequently the ethylene-propylene-rubber is produced in at least one gas phase reactor. Accordingly the heterophasic propylene copolymer of the instant invention can be typically produced in a cascade of up to 4 reactors, where the first reactor is a liquid bulk reactor preferably of loop design, the second reactor is either a liquid bulk reactor preferably of loop design or a gas phase reactor and all subsequent reactors are gas phase reactors preferably of fluidized bed design. The components produced in the first two reactors is(are) crystallizable propylene homopolymer(s), while the component produced in the third and/or fourth reactor is a largely amorphous copolymer with higher amounts of comonomer. According to a specific embodiment, only three reactors are utilized with either two reactors producing homopolymer and the third reactor producing ethylene/propylene rubber or with one reactor producing homopolymer and two subsequent reactors producing ethylene/propylene rubber. According to another specific embodiment, only two reactors are used, one producing homopolymer and the second producing ethylene-propylene rubber.

In the following a preferred process is described in more detail: Such a process for the manufacture of the present invention comprises the following steps:
  (i) polymerizing propylene in a first reactor system, preferably comprising a bulk loop reactor and an optionally gas phase reactor, to obtain a polypropylene homopolymer
  (ii) transferring the obtained propylene homopolymer into a second reactor system preferably comprising at least one gas phase reactor,
  (iii) polymerizing propylene and ethylene in said second reactor system in the presence of the polypropylene homopolymer to obtain an ethylene-propylene rubber, and
  (iii) mixing, in particular melt mixing, the obtained material with ethylene/alpha-olefin elastomer and inorganic filler and alpha-nucleating agents.

The sequence (i) and (iii) can be reversed run, i.e. the ethylene-propylene rubber can be produced first and subsequently the polypropylene homopolymer. However, it is preferred to have the sequence (i) to (iii) as stated above.

The comonomer feeds into the various reactors may be adapted to produce the heterophasic propylene copolymer with the desired properties and the amounts of comonomer will be readily determined by the person skilled in the art.

Further details concerning the manufacture of heterophasic propylene copolymers (HECO) can be derived from WO 97/40080.

In such a procedure, the catalyst system used may be varied between stages but is preferably the same for all stages. Especially preferably a prepolymerized heterogeneous catalyst is used.

As a catalyst for the preparation of the heterophasic propylene copolymer preferably a Ziegler-Natta catalyst system is used. Such Ziegler-Natta catalyst systems are known in the art and comprise a catalyst component, a cocatalyst component and an external donor. The catalyst component of the catalyst system primarily contains magnesium, titanium, halogen and an internal donor. Electron donors control the stereospecific properties and/or improve the activity of the catalyst system. A number of electron donors including ethers, esters, polysilanes, polysiloxanes, and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds, titanium trichloride and titanium tetrachloride being particularly preferred.

It is preferred to use catalysts which can withstand the high temperatures prevailing in the loop reactor. The conventional Ziegler-Natta catalysts for isotactic polymerization of propylene generally have an operating temperature limit of around 80° C., above which they either become deactivated or lose their stereo-selectivity. This low polymerization temperature may put a practical limit on the heat removal efficiency of the loop reactor.

One preferred catalyst to be used according to the invention is disclosed in EP 591 224 which discloses a method for preparing a procatalyst composition from magnesium dichloride, a titanium compound, a lower alcohol and an ester of phthalic acid containing at least five carbon atoms. According to EP 591 224, a trans-esterification reaction is carried out at an elevated temperature between the lower alcohol and the phthalic acid ester, whereby the ester groups from the lower alcohol and the phthalic ester change places.

Magnesium dichloride can be used as such or it can be combined with silica, e.g. by absorbing the silica with a solution or slurry containing magnesium dichloride. The lower alcohol used may be preferably methanol or ethanol, particularly ethanol.

The titanium compound used in the preparation of the procatalyst is preferably an organic or inorganic titanium compound, which is at the oxidation state of 3 or 4. Also other transition metal compounds, such as vanadium, zirconium, chromium, molybdenum and tungsten compounds can be mixed with the titanium compound. The titanium compound usually is a halide or oxyhalide, an organic metal halide, or a purely metal organic compound in which only organic ligands have been attached to the transition metal. Particularly preferred are the titanium halides, especially titanium tetrachloride.

The alkoxy group of the phthalic acid ester used comprises at least five carbon atoms, preferably at least eight carbon atoms. Thus, as the ester may be used e.g. propylhexyl phthalate, dioctyl phthalate, di-isodecyl phthalate and ditridecyl phthalate. The molar ratio of phthalic acid ester and magnesium halide is preferably about 0.2:1.

The transesterification can be carried out, e.g. by selecting a phthalic acid ester—a lower alcohol pair, which spontaneously or by the aid of a catalyst, which does not damage the procatalyst composition, transesterifies the catalyst at an elevated temperature. It is preferred to carry out the transesterification at a temperature which is 110 to 115° C., preferably 120 to 140° C.

The catalyst is used together with an organometallic cocatalyst and with an external donor. Generally, the external donor has the formula

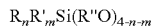

$R_nR'_mSi(R''O)_{4-n-m}$ wherein
R and R' can be the same or different and represent a linear, branched or cyclic aliphatic, or aromatic group;
R" is methyl or ethyl;
n is an integer of 0 to 3;
m is an integer of 0 to 3; and
n+m is 1 to 3.

In particular, the external donor is selected from the group consisting of cyclohexyl methylmethoxy silane (CHMMS), dicyclopentyl dimethoxy silane (DCPDMS), diisopropyl dimethoxy silane, di-isobutyl dimethoxy silane, and di-t-butyl dimethoxy silane.

An organoaluminium compound is used as a cocatalyst. The organoaluminium compound is preferably selected from the group consisting of trialkyl aluminium, dialkyl aluminium chloride and alkyl aluminium sesquichloride.

According to the invention, such catalysts are typically introduced into the first reactor only. The components of the catalyst can be fed into the reactor separately or simultaneously or the components of the catalyst system can be precontacted prior to the reactor.

Such precontacting can also include a catalyst prepolymerization prior to feeding into the polymerization reactor proper. In the prepolymerization, the catalyst components are contacted for a short period with a monomer before feeding to the reactor.

If the polyolefin composition comprises a polymeric nucleating agent which is accomplished by prepolymerising the catalyst with vinyl(clyclo)hexane, this is preferably also done in the catalyst prepolymerisation mentioned above.

As described above, after the manufacture of the heterophasic propylene copolymer the mixing with the ethylene/alpha-olefin and the inorganic filler and the alpha-nucleating agent(s) follows.

Production of ethylene/α-olefin Elastomer

The production of ethylene/α-olefin elastomer is described in detail in: Chum S P, Kao Cl and Knight G W: *Structure, properties and preparation of polyolefins produced by single-site technology*. In: Metallocene-based Polyolefins—Volume 1, Scheirs J and Kaminsky W Eds, John Wiley and Sons Ltd, Chichester (West Sussex, England), 2000 pp. 262-264.

Alternatively, ethylene/α-olefin elastomer, preferably ethylene-1-octene elastomers, which are commercially available and which fulfil the indicated requirements, can be used.

Compounding

The heterophasic copolymer, the ethylene/α-olefin elastomer, inorganic filler, the nucleating agent(s) can be mixed, in particular melt blended, according to any conventional procedure known in the art.

The polyolefin compositions of the present invention are preferably produced by combining the heterophasic propylene copolymer, the ethylene/alpha-olefin elastomer, the inorganic filler, the alpha-nucleating agent(s) and any additional additives, like pigments, stabilisers, processing aids, etc. in a melt mixing device.

Melt mixing devices suited for this process are discontinuous and continuous kneaders, twin screw extruders and single screw extruders with special mixing sections and co-kneaders. The residence time must be chosen such that a sufficiently high degree of homogenisation is achieved.

Measurement Methods

XCS

Xylene cold solubles were determined at 23° C. according ISO 6427. Xylene solubles are defined as the percent by weight that stays in solution after the polymer sample is dissolved in hot xylene and the solution is allowed to cool to 23° C.

MFR

The melt flow rates were measured with a load of 2.16 kg at 230° C. for polypropylene and the inventive polypropylene compositions of the examples. The melt flow rate is measured with a load of 2.16 kg at 190° C. for polyethylene and the ethylene/alpha-olefin elastomers. The melt flow rate is that quantity of polymer in grams which the test apparatus standardised to ISO 1133 extrudes within 10 minutes at a temperature of 230° C. or 190° C. under a load of 2.16 kg.

Tensile Modulus

Tensile Modulus is measured according to ISO 527-2 (cross head speed=50 mm/min; 23° C.) using injection molded specimens as described in EN ISO 1873-2 (dog bone shape, 4 mm thickness).

Charpy Notched Impact Strength

The Charpy notched impact strength was determined according to ISO 179/1eA at 23° C., by using injection moulded test specimens as described in EN ISO 1873-2 (80×10×4 mm).

Intrinsic Viscosity

Intrinsic Viscosity was measured according to DIN ISO 1628-1 (October 1999) in Decalin at 135° C.

Density

Density was determined according to ISO 1183.

CLTE

The Coefficient of Linear Thermal Expansion was determined according to DIN 53752 between 23 and 80° C. by using injection moulded test specimens with dimensions of 80 mm×10 mm×4 mm.

Heat Distortion Temperature HDT

Heat Distortion Temperature was determined according to ISO 75 A using injection moulded test specimens as described in EN ISO 1873-2 (80×10×4 mm).

Particle Size

Median particle size $D_{50}$ and top cut (e.g. $D_{97}$ or $D_{95}$) are determined by a laser diffraction method or a sedimentation method. The actual parameters and determination methods are taken from the technical data sheet of the used filler(s).

Flowability

For each material 45 injection molding simulations were performed with the software Moldflow Plastics Insight 6.2. The most important used parameters are: mould dimensions (width (B)×length (L)×wall thickness (t)), melt temperature and flow front velocity. The width B of the simulated mould was kept constant at B=50 mm. In the simulations the wall thickness t was varied between 2.0-3.5 mm, the length L (=flowlength) was varied from 100 mm to 600 mm, melt temperature was varied between 200-280° C. (lower temperature limit depends on the material), flow front velocity was varied between 50-200 mm/s. Suitable parameter combinations were selected according to DOE (Design of Experiments) by Modde 7.

The simulation result data (incl. pressure progression) were extracted and the DOE software Umetrics Modde 7 was used to fit the data into a 5 dimensional polynomial regression space.

EXAMPLES

The following materials were used:

Polymer 1: Heterophasic propylene copolymer having an MFR of 20 g/10 min, with 82 wt % of a propylene homopolymer matrix (MFR=40 g/10 min) and 18 wt % of an ethylene-propylene rubber. XCS content is 18 wt %. IV of XCS is 2.6 dl/g. Ethylene content of XCS is 34 wt %. The heterophasic copolymer contains 35 ppm pVCH as polymeric nucleating agent. Polymer 1 further contains 0.05 wt % of calcium stearate, 0.1 wt % of antioxidant (Pentaerythrityl-tetrakis(3-(3',5'-di-tert.butyl-4-hydroxyphenyl)-propionate and Tris(2,4-di-t-butylphenyl)phosphite in 1:2 ratio) and 0.3 wt % of glyceryl monostearate Polymer 2: Heterophasic propylene copolymer having an MFR of 12 g/10 min, with 70 wt % of a propylene homopolymer matrix (MFR=35 g/10 min) and 30 wt % of an ethylene-propylene rubber. XCS content is 30 wt %. IV of XCS is 1.9 dl/g. Ethylene content of XCS is 40 wt %. Polymer 2 further contains 0.1 wt % Pentaerythrityl-tetrakis(3-(3',5'-di-tert.butyl-4-hydroxyphenyl)-propionate and 0.1 wt % Tris(2,4-di-t-butylphenyl)phosphite and 0.05 wt % calcium stearate.

Polymer 3: Heterophasic propylene copolymer having an MFR of 12.5 g/10 min, with 70 wt % of a propylene homopolymer matrix (MFR=30 g/10 min) and 30 wt % of an ethylene-propylene rubber. XCS content is 19 wt %. IV of XCS is 2.2 dl/g. Ethylene content of XCS is 40 wt %. Polymer 3 further contains 0.03 wt % Pentaerythrityl-tetrakis(3-(3',5'-di-tert.butyl-4-hydroxyphenyl)-propionate and 0.06 wt % Tris(2,4-di-t-butylphenyl)phosphite and 0.3 wt % glyceryl monosterate, 0.05 wt % calcium stearate, 0.03% synthetic hydrotalcite.

Talc: Tital 15, commercially available from Ankerpoort Nev. Talc 1 has a $D_{50}$ of 5.7 µm and a topcut ($D_{97}$) of 21 µm. According to the technical data sheet of Tital 15, both values are determined by a laser diffraction method.

Elastomer 1: ethylene-1-octene copolymer having a comonomer content of 38 wt, an MFR (190° C., 2.16 kg) of 1.0 g/10 min and a density of 870 kg/m$^3$. Elastomer 1 is available as Engage 8100 from DuPont Dow Elastomers L.L.C.

Elastomer 2: Ethylene-1-octene copolymer, having an MFR (190° C., 2.16 kg) of 30.0 g/10 min and a density of 882 kg/m$^3$. Elastomer 2 is available as Exact 8230 from Exxonmobil.

NA11: sodium-2,2'-methylene-bis(4,6-di-t-butylphenyl) phosphate

ABS/PA: Triax® DP 3157, a blend of acrylonitrile butadiene styrene with polyamide, commercially available from INEOS ABS S.L.

PC/PBT: XENOY XD1575S, a blend of polycarbonate with polybutylene terephthalate, commercially available from SABIC.

TABLE 1

(example compositions)

| | example 1 [wt %] | example 2 [wt %] | example 3 [wt %] | example 4 wt % | example 5 [wt %] |
|---|---|---|---|---|---|
| polymer 1 | 60.9 | — | — | — | — |
| polymer 2 | — | 62.5 | — | — | — |
| polymer 3 | — | — | 71.9 | — | — |
| ABS/PA | — | — | — | 100 | — |
| PC/PBT | — | — | — | — | 100 |
| talc | 34 | 26 | 24 | — | — |
| NA11 | 0.1 | — | 0.1 | — | — |
| elastomer 1 | 5 | — | 4 | — | — |
| elastomer 2 | — | 11.5 | — | — | — |

TABLE 2

(properties of example compositions)

| | | example 1 | example 2 | example 3 | example 4 | example 5 |
|---|---|---|---|---|---|---|
| Density | g/cm$^3$ | 1.15 | 1.05 | 1.05 | 1.17 | 1.21 |
| CLTE | µm/m · K | 48 | 51 | 58 | 92 | 113 |
| Tensile Modulus | MPa | 3100 | 1350 | 1800 | 2175 | 2150 |
| Flowability | mm | 550 | 610 | 600 | 275 | 380 |
| HDT A | ° C. | 71 | 50 | 56 | 87 | 67 |
| NIS +23° C. | kJ/m$^2$ | 6.9 | 40 | 30 | 8.5 | 58 |

The flowabiliy values in Table 2 were selected from simulation results for a mould having the dimensions 50×600 3.5 mm$^3$, a flow front velocity of 150 mm/s, an injection pressure of 50 MPa and a melt temperature of 240° C. (for polyolefins) and 280° C. (examples 4 and 5).

As can be seen, the polyolefin composition of example 1 has a significantly improved flowability (for a given mould geometry and given injection conditions) compared to ABS/PA and PC/PBT blends. The chosen melt temperatures are typical processing temperature for the respective material and therefore suitable for comparison purposes. The composition of example 1 is even superior in flowability to the compositions of examples 2 and 3.

We claim:
1. Polyolefin composition comprising
    a. 54-70 wt %, of a heterophasic propylene copolymer comprising
        i. 70-90 wt %, based on the weight of the heterophasic propylene copolymer of a propylene homopolymer, and
        ii. 10-30 wt %, based on the weight of the heterophasic propylene copolymer of an ethylene-propylene rubber,
    b. 2-10 wt % of an ethylene/α-olefin elastomer, the α-olefin being a $C_4$-$C_{10}$ α-olefin,
    c. 20-46 wt % of an inorganic filler, and
    d. at least two different α-nucleating agents in a total amount of 0.0011-2.0 wt %;
    wherein the heterophasic propylene copolymer and the ethylene/α-olefin elastomer together account for at least 97% of all polymeric components of the polyolefin composition; and
    wherein the polyolefin composition has a CLTE<60 µm/m.K.

2. The polyolefin composition according to claim 1, wherein the inorganic filler is selected from the group consisting of talc and wollastonite.

3. The polyolefin composition according to claim 1, wherein the inorganic filler has a median particle size ($D_{50}$) of 1.0-15 µm and a top cut ($D_{97}$) of 3-50 µm.

4. The polyolefin composition according to claim 1, wherein the ethylene/α-olefin elastomer has a density of from 860-915, kg/m$^3$.

5. The polyolefin composition according to claim 1, wherein the ethylene/α-olefin elastomer has an MFR of from 0.3-100 g/10 min (190° C., 2.16 kg).

6. The polyolefin composition according to claim 1, wherein the MFR of the polyolefin composition is from 5.0-50 g/10 min (230° C., 2.16 kg).

7. The polyolefin composition according to claim 1, wherein the alpha-nucleating agents are selected from the group consisting of aluminum hydroxy-bis[2,4,8,10-tetrakis(1,1-dimethylethyl)-6-hydroxy-12H-dibenzo-[d,g]-dioxaphosphocin-6-oxidato], sodium-2,2'-methylene-bis(4,6-di-t-butylphenyl)-phosphate, aluminum-hydroxy-bis[2,2'-methylene-bis(4,6-di-t-butyl-phenyl)-phosphate], sorbitol based nucleating agents and polymeric nucleating agents selected from the group consisting of vinylcycloalkane polymers and vinylalkane polymers.

8. The polyolefin composition according to claim 7, wherein at least one of the alpha nucleating agent is a polymeric nucleating agent selected from the group consisting of vinylcycloalkane polymers and vinylalkane polymers.

9. The polyolefin composition according to claim 1, wherein the intrinsic viscosity of the XCS (Xylene cold solubles) content of the heterophasic propylene copolymer is in a range of 1.5-3.5 dl/g.

10. The polyolefin composition according to claim 1, wherein the ethylene-propylene rubber of the heterophasic propylene copolymer is unimodal.

11. Moulded article comprising:
a polyolefin composition comprising
    a. 54-70 wt %, of a heterophasic propylene copolymer comprising
        i. 70-90 wt %, based on the weight of the heterophasic propylene copolymer of a propylene homopolymer, and,
        ii. 10-30 wt %, based on the weight of the heterophasic propylene copolymer of an ethylene-propylene rubber,
    b. 2-10 wt % of an ethylene/α-olefin elastomer, the α-olefin being a $C_4$-$C_{10}$ α-olefin,
    c. 20-46 wt % of an inorganic filler, and
    d. at least two different α-nucleating agents in a total amount of 0.0011-2.0 wt %;
    wherein the heterophasic propylene copolymer and ethylene/α-olefin elastomer together account for at least 97% of all polymeric components of the polyolefin composition; and
    wherein the moulded article has a CLTE<60 µm/m.K.

12. The moulded article according to claim 11, wherein the moulded article is an injection moulded article.

13. The moulded article of claim 11 having the following properties:
    a. Tensile Modulus>2500 MPa,
    wherein the moulded article produced from said polyolefin composition is an injection moulded article.

14. The moulded article according to claim 11, wherein the intrinsic viscosity of the XCS content of the heterophasic propylene copolymer is in a range of 1.5-3.5 dl/g.

15. The moulded article according to claim 11, wherein the ethylene-propylene rubber of the heterophasic propylene copolymer is unimodal.

16. Polyolefin composition comprising
    a. 54-70 wt %, of a heterophasic propylene copolymer comprising
        iii. 70-90 wt %, based on the weight of the heterophasic propylene copolymer of a propylene homopolymer, and
        iv. 10-30 wt %, based on the weight of the heterophasic propylene copolymer of a unimodal ethylene-propylene rubber,
    b. 2-10 wt % of an ethylene/α-olefin elastomer, the α-olefin being a $C_4$-$C_{10}$ α-olefin,
    c. 20-46 wt % of an inorganic filler, and
    d. at least two different a-nucleating agents in a total amount of 0.0011-2.0 wt %;
    wherein the heterophasic propylene copolymer and the ethylene/α-olefin elastomer together account for at least 97% of all polymeric components of the polyolefin composition; an intrinsic viscosity of the XCS (Xylene cold solubles) content of the heterophasic propylene copolymer is in a range of 1.5-3.5 dl/g; and
    wherein the polyolefin composition has a CLTE<60 µm/m.K.

* * * * *